A. O. ELLITHORP.
INSECT DESTROYER.
APPLICATION FILED MAR. 14, 1908.
913,205.
Patented Feb. 23, 1909.
2 SHEETS—SHEET 1.
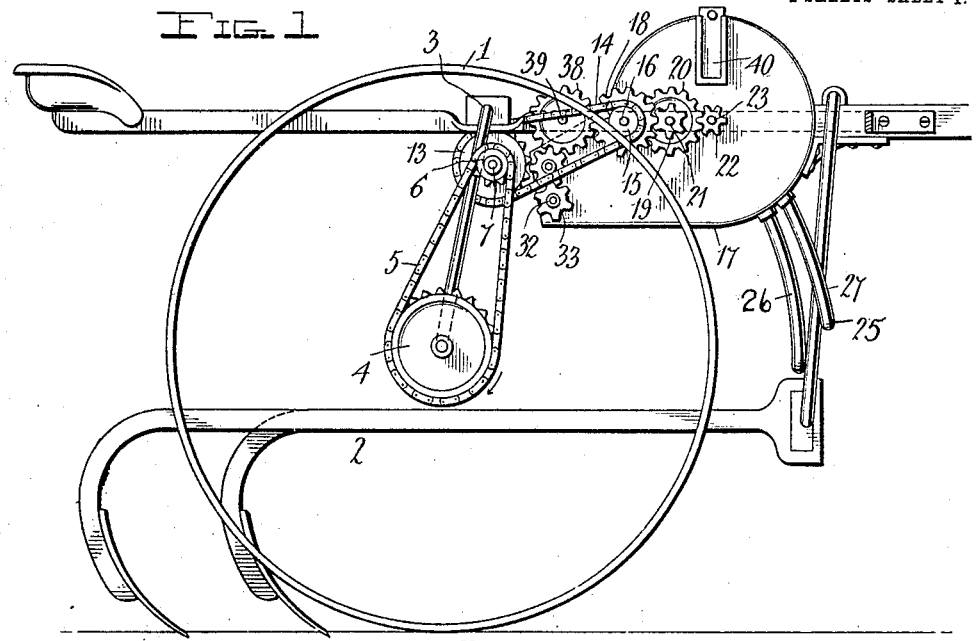
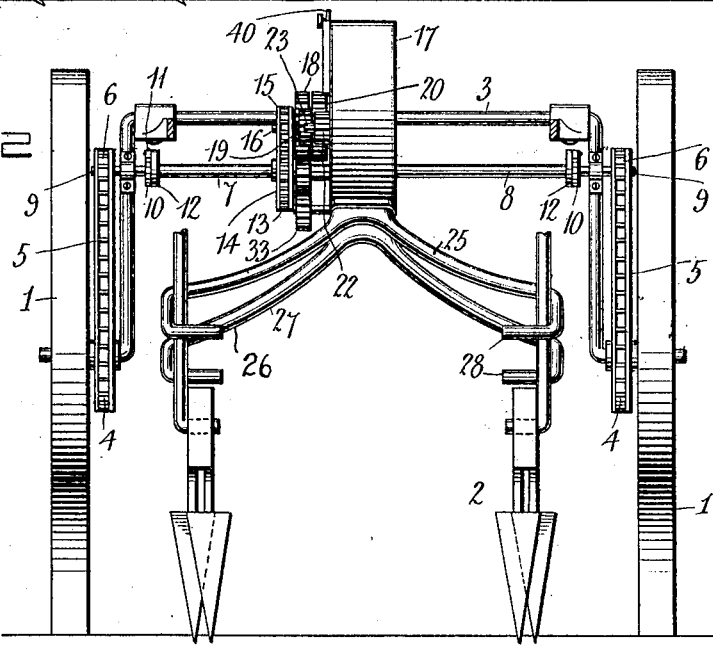
Inventor
Asa O. Ellithorp

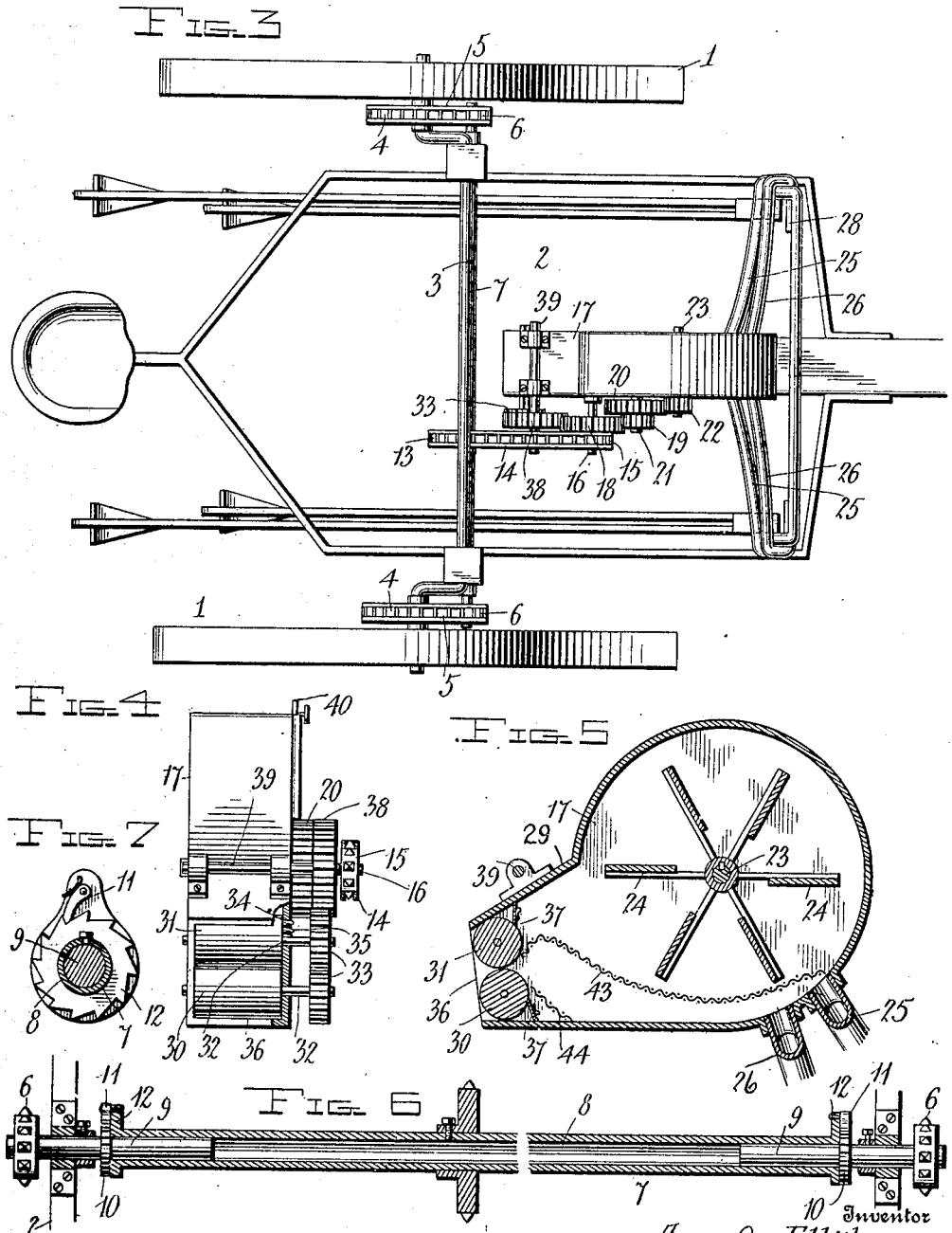

UNITED STATES PATENT OFFICE.

ASA O. ELLITHORP, OF DOUGHERTY, OKLAHOMA.

INSECT-DESTROYER.

No. 913,205.   Specification of Letters Patent.   Patented Feb. 23, 1909.

Application filed March 14, 1908.   Serial No. 421,211.

*To all whom it may concern:*

Be it known that I, ASA O. ELLITHORP, a citizen of the United States, residing at Dougherty, Oklahoma, have invented certain new and useful Improvements in Insect-Destroyers; and I do hereby declare the following to be a full, clear, and exact description of the invention, such as will enable others skilled in the art to which it appertains to make and use the same.

This invention relates to new and useful improvements in insect destroyers and it has primarily for its object to produce a novel device of this character wherein the insects to be destroyed are collected through suction.

It is also an object of the invention to provide in a novel device of this character movable means for destroying the insects after being collected.

It is also an object of the invention to provide novel means in combination with the movable destroying means for cleansing said movable means.

Furthermore, it is the object of the invention to provide a novel device of this character that can be readily applied to various agricultural machines and which will prove simple in construction, efficient in practice and economical in the manufacture.

With the above and other objects in view the invention consists of the details of construction and the novel arrangement and combination of parts to be hereinafter referred to.

In describing the invention in detail reference will be had to the accompanying drawings forming a part of this specification, wherein like characters of reference denote corresponding parts in the several views and in which:

Figure 1 is a view in side elevation of a straddle row cultivator with the invention applied thereto. Fig. 2 is a view in rear elevation. Fig. 3 is a plan view. Fig. 4 is an enlarged fragmentary view in elevation of the rear portion of the fan casing. Fig. 5 is a sectional view of Fig. 4. Fig. 6 is a detail sectional view illustrating the main driving shaft, and Fig. 7 is a sectional view of the shaft showing the pawl and ratchet wheel.

For the convenience of description and illustration, the invention is shown applied to a straddle row cultivator, although it is to be understood that any desired agricultural machine may be employed, the slight changes required to apply the invention requiring mechanical skill only and not constituting invention.

In the drawings, 1 denotes the supporting wheels of an ordinary or preferred straddle row cultivator 2 mounted on the axle 3 thereof. Fixed to the inner face of each of the wheels 1, is a sprocket wheel 4, around which passes a chain 5, engaging a sprocket 6 on the main shaft 7. The shaft 7 is mounted in the frame of the cultivator in any convenient position, it only being necessary that it be free from the operating mechanism of the cultivator. The shaft 7, is of the peculiar construction illustrated in Fig. 6. The shaft in detail comprises a hollow central section 8, which is telescopically engaged at each end by a shaft section 9 to which the sprocket 6 is fixed. On the two sides adjacent the section 8 is a ratchet wheel 10 engaged by a pawl 11, pivoted to a collar 12 on the end of the section 9. This arrangement assures a constant rotation of the central section 9, especially when the cultivator is making a turn at the end of a row. On the central section 8 of the main shaft 7 is a sprocket wheel 13 which is engaged by a chain 14 passing around a sprocket wheel 15 mounted on a stud shaft 16 carried by the fan casing 17. The fan casing is supported on the cultivator frame in any desired manner, said attachment forming no essential feature of the invention. The sprocket wheel 15 is formed with a gear wheel 18. This wheel 18 meshes with a small gear 19 formed with a larger gear 20. The gears 19 and 20 are mounted on a stud shaft 21 carried by the fan casing. The gear 20 meshes with a gear 22 fixed on the fan shaft 23. From the foregoing it will be readily seen that the rotation of the supporting wheels 1 will operate the suction fan. The fan shaft 23 has mounted thereon the blades 24 which may be of a shape that produces the best results with least resistance.

Communicating with the interior of the fan casing at opposite sides are pipes or tubes 25 and 26 which tube 25 is slightly in advance of the tube 26. This is done to prevent one tube interfering with the successful operation of the other. Each pipe 25 and 26 has outwardly diverging portions forming forked branches 27 in order to straddle a row and the ends of the branches are bent inwardly as at 28. The blades 24 rotate in a direction to create a suction through the tubes 25 and 26 and the suction draws from the plants the insects congregated thereon. The tubes 25 and 26 intersect the forward end of the fan casing which latter has its opposite rear end terminating in a funnel-shaped portion 29. In the walls of this funnel-shaped portion 29 is mounted a lower crushing roller 30 and an upper crushing roller 31. The shafts 32 supporting the rollers project exteriorly of the casing and are provided with the intermeshing gears 33. This arrangement of gears affords a positive rotation of each roller, and assures of the same rotating in unison.

Any method may be employed for mounting the rollers but it has been found best to mount one of the shafts 32 in elongated bearings as 34 and to provide springs 35 for holding the gears in mesh, and also maintaining close relation of the rollers and at the same time permit movement of one of the rollers with relation to the other which enhances the successful operation of the machine.

The funnel-shaped portion 29 has a discharge opening 36 which permits the escape of air and creates a current which conveys the insects to said crushing rollers 30 and 31, respectively, which latter mutilates said insects and expels the same between the said rollers and discharges them upon the ground through the opening 36.

In order to keep the rollers clean for successful operation, each roller is provided with a spring-pressed blade 37 contacting with its periphery. For operating the rollers a gear wheel 38 is mounted on a stub shaft 39 carried by the casing 17 and meshes with the gear 33 on the upper roller 31 and with the gear wheel 18. It will be seen that all movable parts are operated from the main shaft.

To regulate the suction, one side of the casing is provided with a sliding door 40, the operation and function of which is believed to be clearly apparent.

Within the fan casing 17 is a reticulated screen 43 which is disposed to direct the insects from the pipes 25 and 26 to the rollers 30 and 31. To prevent the insects from passing between the space between the lower roller and the bottom wall of the casing 17 at the funnel portion 29 is an inclined screen 44.

Having described the invention, what is claimed is—

In combination with a wheeled vehicle of a fan casing supported thereby, branch pipes depending from said fan casing and in communication therewith, said branch pipes diverging outwardly with respect to each other, whereby the same will straddle a row of plants, suction means within the fan casing for creating suction through the branch pipes, a funnel-shaped extension on said fan casing and forming a discharge opening, crusher rollers rotatably mounted within said funnel-shaped extension, means for tensioning one of the rollers to hold the same in close contact with the remaining roller, spring pressed blades contacting with the rollers, reticulated screens disposed within the fan casing whereby insects will be directed from the branch pipes to the rollers and gear mechanism controlled by the vehicle wheels for actuating simultaneously the suction means and crusher rollers.

In testimony whereof, I affix my signature, in presence of two witnesses.

ASA O. ELLITHORP.

Witnesses:
T. J. JONES,
J. R. BOBO.